Figures 1, 2, 3, 4, 5:
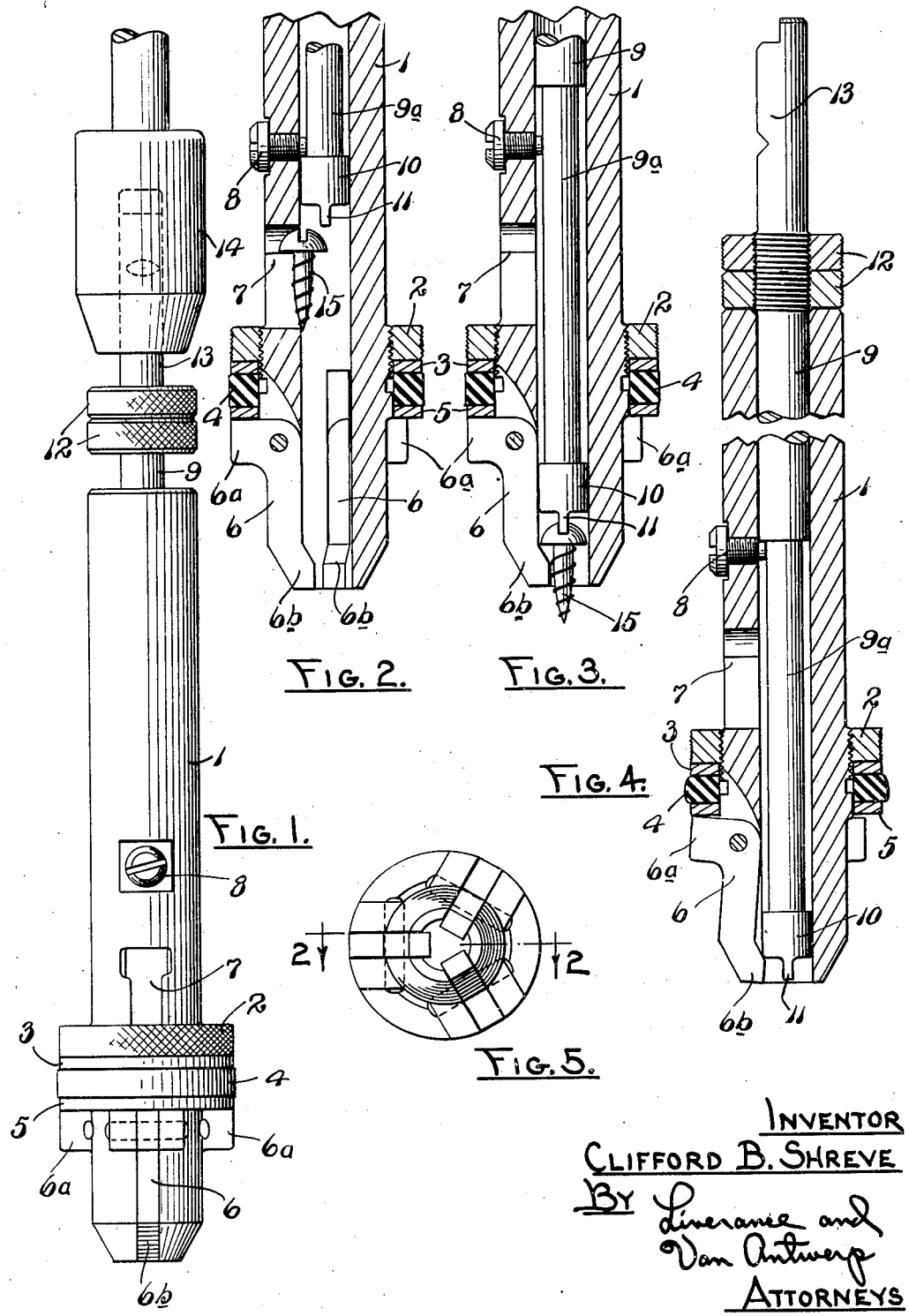

Oct. 11, 1949.  C. B. SHREVE  2,484,655
SCREW HOLDER FOR SCREW DRIVERS
Filed July 14, 1947

INVENTOR
CLIFFORD B. SHREVE
BY Liverance and
Van Antwerp
ATTORNEYS

Patented Oct. 11, 1949

2,484,655

UNITED STATES PATENT OFFICE 2,484,655

SCREW HOLDER FOR SCREW DRIVERS

Clifford B. Shreve, Buchanan, Mich.

Application July 14, 1947, Serial No. 760,770

1 Claim. (Cl. 145—52)

The present invention is concerned with improvements in a novel apparatus for holding screws in position while they are being driven.

It is an object and purpose of the invention to provide a screw holder and driver with which all types of screws may be used and which is particularly useful for screws of small diameters or short lengths, which are hard to handle and start with the ordinary screw driver. The invention is equally useful and adaptable for machine power driven tools or hand tools. With my invention the screw will be properly held, without regard to its size or length, during the time that it is being driven. Also there is no danger of slipping off or other disconnection of the driving means from the head of the screw. Means are also provided for automatically centering the screw and maintaining it and the driving means therefor in positive alinement during driving until the screw is firmly seated.

One desirable object and purpose of the invention is concerned with an adjustable tension means operating upon screw holding jaws which hold the screw in alinement with its driver and with which the best conditions of tension force for holding the screw may be provided.

Many other objects and purposes, including structure so that the operator may hold and guide the screw holder, protected from the rotating inner screw driving member; a novel means for feeding or entering the screw which is to be driven and with the gripping mechanism on the screw stationary and at rest while the screw is being driven; also a means for controlling the amounts that the screws may be driven, will appear and be understood from the following description, taken in connection with the accompanying drawing, in which, Fig. 1 is an elevation of the screw holder and driver structure of my invention, Fig. 2 is a fragmentary vertical section through the lower part thereof, illustrating the entrance or feeding of a screw thereto, Fig. 3 is a section similar to Fig. 2, showing the screw as it is driven at an intermediate stage of driving, Fig. 4 is a like, but somewhat longer vertical section showing the position of the parts at the completion of a screw driving operation, and Fig. 5 is an under plan view of the structure shown in Fig. 1.

Like reference characters refer to like parts in the different figures of the drawing.

In the structure a tubular body member 1, which may have relatively thick walls as shown, at a distance above its lower end is slightly enlarged in diameter and exteriorly threaded for receiving an adjustable ring nut 2. Below the ring nut a washer 3 is located, and below it, a relatively heavy ring 4 of resilient material, rubber or its equivalent. A second washer 5 is below the resilient ring 4 at its lower side and bears upon the outwardly extending generally horizontal upper arms 6a of a plurality of spaced screw gripping jaws 6, which are located in radial slots in the lower end portion of the member 1, and are pivotally mounted to turn about horizontal axes located near the upper ends of the jaws. At their lower ends the jaws have downwardly and inwardly inclined terminal sections or fingers 6b (Fig. 4), which at their ends extend into the cylindrical axial opening through the member 1, but are sufficiently spaced for the threaded shank of a screw to pass between them. It is evident that by adjusting the position of the ring 2, the jaws at their lower ends may be adjusted to greater or less distances apart.

An entrance slot 7 of a generally T-form, wider at its upper end than at its lower portion, is made in a side of the body member 1, through which screws in succession may be fed into the central axial opening of the member 1. A screw 8 is threaded through a side of the body 1 a distance above the slot 7, the purpose of which will be hereafter described.

The rotatable screw driving element consists of a shaft 9, which is rotatably and slidably mounted in the axial opening through the member 1. It is reduced in diameter, as at 9a, at its lower end portion, leaving a head 10 at the lower end of the same diameter as the upper part of the shaft. A tongue 11 for entrance into the slot in the head of a screw projects downwardly from the head 10. Above the upper end of the member or body 1, shaft 9 is slightly increased in diameter and threaded for two nuts 12, as shown in Fig. 4.

It is evident that on downward movement of the shaft 9, it will be stopped when the lower nut 12 comes against the upper end of the body member 1. In the upward movement of the shaft 9, it is stopped and will not disconnect, as the shoulder at the upper end of the head 10 comes against the inner end of the screw 8, as shown in Fig. 2.

The upper end 13 of the shaft 9 above the nuts 12 is formed for a detachable connection with a suitable chuck as 14 in Fig. 1 on a driving shaft or, for example, used with a brace such as used with drills or bits, or any other driving means which may be adapted for use. The chuck 14 may be adapted to a power driven shaft or one which is manually operated.

In the operation, with the head 10 against the screw 8, as in Fig. 2, a screw 15 is passed through the entrance slot 7 and drops by gravity substantially to the position shown in Fig. 3, where it is stopped by engagement of its head against the inner sides of the jaws 6. The screw driving shaft 9 is moved from the position in Fig. 2 toward that in Fig. 3. The tongue 11 seats in the slot of the head of the screw. By turning the shaft 9, the screw may be driven. In such driving the screw is held by the jaws 6 at spaced apart places around the head and is, accordingly, securely held against any lateral or other departure from a straight axial driving thereof. When the screw has been driven as far as wanted, this being controlled by the adjustable position of the nuts 12, further driving will stop when the lowermost nut comes against the upper end of the body 1. It is of course to be understood that the lower end of the body 1 bears against the part into which the screw is being driven, and normally the tongue 11 will reach substantially to the surface, against which the lower end of the body 1 is pressed. The body 1 may be held by a hand during operation to maintain it in proper position.

It is further evident that as the head of the screw is driven past the inclined lower fingers 6b, said fingers are pushed outwardly with an accompanying compression of the resilient ring 4. With screws of the same head diameter, the pressure of the lower ends of the jaws against the head will increase upon turning the adjusting ring nut 2 downwardly and decrease on turning it in the opposite direction. This is, therefore, within the control of the operator, who may adjust the jaws to obtain the best conditions. So far as nuts 12 are concerned, the lower one acts as a stop and the other locks it against undesired change of position.

It is to be noted that the inwardly extending portions 6b of the jaws firmly grip the body portion of the screw but the head of the screw is loosely guided between the jaws 6 and in the bore of the body member 1. This detail has been found in practice to be a valuable contribution to the successful operation of the device.

The structure has proved very practical and useful. Screws which are otherwise difficult to handle, those of short length and small diameter, are very readily handled and driven. One valuable feature of the invention is that the driving tongue 10 never comes against the surface of the work into which the screw is being driven. There is no slipping off the head of the screw, as with the usual screw driver, with a resultant marring of the surface of the part into which the screw is being driven.

The invention is defined in the appended claims and is to be considered comprehensive of all forms of structure coming within their scope.

I claim:

A screw driving device comprising, a cylindrical body having a central passage therethrough, a shaft having a screwdriver bit on one end and rotatably and longitudinally movable in said body, a plurality of circumferentially spaced longitudinally extending slots in one end of the body and communicating with said passage, a plurality of jaws pivotally mounted intermediate their ends on the body in said slots and having ends movable into said central passage through the slots in the same plane transverse to the axis of the passage, their other ends extending outwardly from their pivots in the same plane transverse to the axis of the passage, a ring screw threaded onto the body adjacent said jaws and longitudinally adjustable upon the body, and a rubber ring surrounding said body and interposed between said screw threaded ring and the outwardly extending ends of the jaws, the inner ends of the jaws serving to grip a screw between them.

CLIFFORD B. SHREVE.

REFERENCES CITED

The following references are of record in the file of this patent:

UNITED STATES PATENTS

| Number | Name | Date |
|---|---|---|
| 198,935 | Gilchrist | Jan. 8, 1878 |
| 248,668 | Rochow | Oct. 25, 1881 |
| 734,204 | Voss | July 21, 1903 |
| 944,561 | Kenan | Dec. 28, 1909 |
| 1,450,203 | Brown | Apr. 3, 1923 |
| 1,683,815 | Brown et al. | Sept. 11, 1928 |
| 1,984,282 | Ray | Dec. 11, 1934 |
| 2,195,421 | McLeod | Apr. 2, 1940 |

FOREIGN PATENTS

| Number | Country | Date |
|---|---|---|
| 1,243 | Great Britain | Jan. 23, 1905 |